Figure 1:
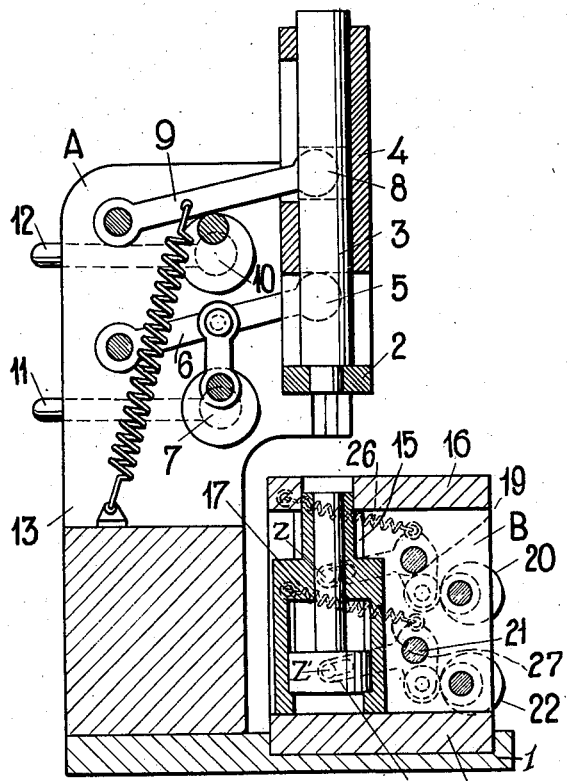

Aug. 15, 1939    H. SKOLAUDE    2,169,665
PRODUCTION OF PRESSED ARTICLES HAVING A PATTERN EXTENDING
RIGHT THROUGH THEM FROM MATERIALS IN POWDER FORM
Filed Aug. 31, 1937    2 Sheets-Sheet 1

Aug. 15, 1939.   H. SKOLAUDE   2,169,665
PRODUCTION OF PRESSED ARTICLES HAVING A PATTERN EXTENDING
RIGHT THROUGH THEM FROM MATERIALS IN POWDER FORM
Filed Aug. 31, 1937   2 Sheets-Sheet 2

H. Skolaude
INVENTOR

By: Glascock Downing & Seebold
ATTYS.

Patented Aug. 15, 1939

2,169,665

UNITED STATES PATENT OFFICE 2,169,665

PRODUCTION OF PRESSED ARTICLES HAVING A PATTERN EXTENDING RIGHT THROUGH THEM FROM MATERIALS IN POWDER FORM

Heinrich Skolaude, Gross-Schonau, Czechoslovakia

Application August 31, 1937, Serial No. 161,860
In Czechoslovakia July 25, 1936

9 Claims. (Cl. 18—5)

The present invention relates to a method of and an apparatus for producing pressed articles, such as buttons, buckles, knife handle plates or the like, having a pattern extending right through them, hereinafter referred to as the permeating pattern, from substances in the form of powder, such as horn meal, casein, blood, glass powder or the like.

It has already been proposed to make from powder substances which become plastic when heated pressed articles with coloured patterns. Originally a one-colour blank was first pressed, which, after stencils had been placed on it, was either sprayed with colour lacs or was strewed in places with a pigment powder of another colour, whereupon the article was finish-pressed. As the pressed article thus produced bore the pattern only on its upper side, namely on the front, it has been the practice, in order to give the pressed article the appearance of having a permeating pattern, to apply the same coloured pattern on the back of the preliminarily pressed blank as well in such a manner that the pattern on the back was in register with the pattern on the front. In order better to produce the impression of a pattern extending right through the pressed article, the pattern was produced once or several times in the interior of the pressed article as well. For doing this, the pressed article was built up in layers, each layer being patterned with the aid of a stencil or pigment or a pulverulent material of a different colour and the individual layers were superposed in such a manner that the pattern of the bottom layer registered exactly with the pattern on the other upper layers. The whole was then pressed together. Whilst it was possible in this way to obtain a better depth effect and thus more strongly to produce the impression of a pattern extending throughout the pressed article, than was the case with the earlier methods referred to, an actual permeating pattern which extends from one side of the pressed article right through to the opposite side of the pressed article could also not be obtained by this method as well, since the continuity of the pattern was broken by the interposed unpatterned layers.

The simplest way of obtaining, in view of the transparent material, a permeating pattern would naturally have been to strew on by means of a stencil a single thick patterned layer and to fill out the interstices. This obvious idea could however not lead to the desired result for two reasons. Firstly, it is impossible in this way to continue the desired pattern throughout the entire thickness of the layer, owing to the slope which forms at the strewed-on powder pattern; for, owing to the angle of slope, this strewed-on layer becomes much broader at the base surface than at the top surface. Secondly, a strewed-on layer of such thickness was impossible if only for the reason that the piles of pigment produced in this manner, more particularly if it should be finely grained, will already collapse when only of a very slight height.

The present invention relates to a method, according to which pressed articles can be made with a pattern which really extends right through them. The invention is based on the general idea to mould the differently coloured powders required for the production of the patterned pressed article individually in succession next to one another and one within the other. The method consists in this that, by means of profiled pistons or sliding plungers or other tools profiled with the pattern spaces are formed in the material filling a mould corresponding to the shape of the finished product, which spaces are filled with material of another colour, whereupon the filling with the pattern permeating it is subjected to a finish-pressing operation. According to the invention the method may for instance be such that a mould is used, in the bottom of which profiled pistons are arranged, which are pushed in such a manner into the interior of the mould that their end wall reaches at least up to the level of the filling, whilst their walls which are guided by cut-away places in the bottom are so high that, on being displaced, they will not leave the cut-away places in the bottom. The remainder of the space in the mould is next filled with material in powder form. Thereupon the pistons, by being moved downwards, are gradually pushed out of the mould and, to the extent to which they are pushed out, the space thus freed is filled with material of another colour. In the case of complicated and multi-coloured patterns, the individual pistons can be pushed in and out successively. The procedure may also be such, that the entire space in the mould is filled with a material in powder form, whereupon, by displacing one or more profiled pistons, a portion of the material is ejected and then removed. Thereupon the pistons are lowered, whereby they make free the space for filling with material of another colour.

The method according to the present invention may for instance be carried out in the following manner:

A mould, the bottom of which is formed by one or more pistons profiled with the pattern, is completely filled with a one-colour powdered material. A matrix is then placed on the mould, which is cut out to the pattern, and thereupon by means of the bottom piston a portion of the filled material is forced or punched upwards through the matrix. After the ejected material has been removed, the piston is lowered again, until its upper end surface is level or almost level with the moulded material. The thus freed cut-away part of the matrix, which must be held at a suitable height is thereupon filled to the necessary height with the material of another colour. The upper end surface of the piston forms the support. The piston is thereupon further lowered, until it reaches its original bottom position. This motion is followed by the material resting on the piston, which pushes itself or interposes itself next to or into the material first moulded. As the material which was first moulded reaches to the bottom and as the material moulded in the second operation also pushes itself to the bottom, a pressed article which is completely permeated with the pattern is thus obtained after the finish-pressing operation.

By employing several pistons and matrices pressed articles may be obtained in accordance with the invention, which have a simple or complicated pattern which in every case extends right through them. The described operation need then only be repeated several times. The method according to the invention may also be carried out in various combinations. If it be desired for instance to produce a pressed article with a target-like ring pattern, the most suitable procedure is first to mould the material which lies nearest to the periphery of the pressed article or the mould wall. Thus, a support is made at the outermost ring and the centre is moulded last. In order for instance to obtain a pressed article having a fine dark or light veining, this veining will of course not be ejected out of the moulded mass by means of a fine piston. This would lead to difficulties, as it would not be easy to introduce the material into the fine slit. In this case, the material lying on one side of the vein to be formed will be first moulded, whereupon all the rest of the mould will be filled with the coloured material for the vein and finally so much of this material will finally be ejected that only the fine vein will remain. Thereupon the material which is to come next to the other side of the fine vein will be moulded.

The introduction, ejection and subsequent introduction of the coloured materials may also be effected under pressure, suitably profiled plungers being placed above the coloured material which is to be introduced or ejected. Different effects can also be obtained, if pressure be applied during the moulding of one part of the pattern, whilst another part is only poured in loosely. It is of advantage to make the matrices at least as high as the height of the article to be moulded. In this way it will be unnecessary to measure off the quantities of powder to be introduced. For systematic working according to the invention the requisite matrices and plungers may also be arranged in a circle or next to one another at accurate distances apart and the mould may be moved along beneath them in such a manner that in the pauses between the individual filling and ejecting operations it travels in the working rhythm from plunger to plunger or from matrice to matrice. Conversely the mould may be made stationary and the matrices and the plungers be brought to the mould in the working rhythm. Finally both the mould and the plungers and matrices may be moved with respect to one another and, in order to obtain a greater output, the mould may be made in the form of a plate and be provided with a considerable number of filling spaces, that is may be a multiple mould.

The pressed article which has been moulded and permeated with the pattern in the mould may either be preliminarily or finish-pressed in the mould itself or may be transferred to a second mould for finish-pressing.

Figure 2:
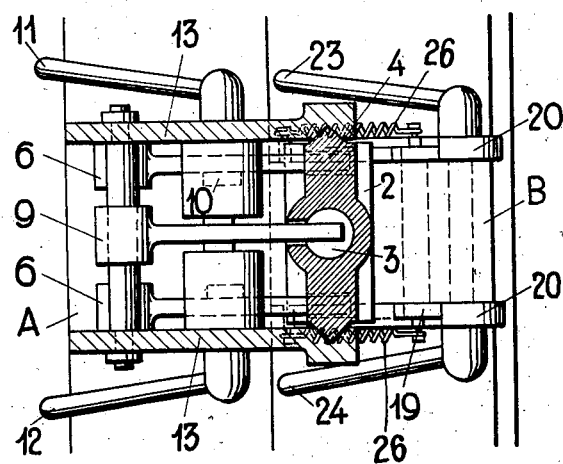
Figure 4:
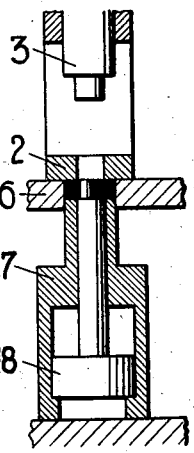

An example of how the method according to the present invention may be carried out is illustrated in the accompanying drawings, in which Fig. 1 is a side view in section of an example of an apparatus for carrying out the method, Fig. 2 a plan view of this apparatus and Figs. 3 to 12 a diagrammatic representation of how a pressed article with a ring pattern extending throughout is made by the method according to this invention.

The arrangement shown in Figs. 1 and 2 for carrying out the method comprises an upper mould part A and a lower mould part B. The upper mould part A is fixed on the slide rail 1, in which the lower mould part B fits and can be slid in the longitudinal direction of the slide rail and lifted from the latter. In the upper part A of the mould the matrix 2 and the plunger 3 are mounted. The matrix 2 is fixed to the prismatic guide 4, through which the plunger 3 is also taken. The prismatic guide 4 is provided with two slots 5 into which engages the pair of one-armed levers 6 which is connected with the crank arrangement 7 and through the rotary motion of which the raising and lowering of the prismatic guide 4 and of the matrix 2 fixed thereto is effected. The plunger 3 is also provided with a slot 8, in which the one-armed lever 9 engages, which rests on the eccentric of the crank shaft 10 and through the rotary motion of which the plunger 3 which is acted on by a spring 25 can descend or be raised. For turning the crank arrangement 7 the handle 11 is provided and for turning the crank shaft 10 the handle 12. The rotary motion of the crank shaft 10 and of the crank arrangement 7 may be limited or fixed by stops not shown in the drawings. The plunger 3 is so guided and arranged that its profiled stamping extension fits exactly into the interior of the matrix 2. The side walls 13 provide the bearings and guides for the whole mechanism.

The lower part B of the mould consists of the base plate 14 and the pair of supports 15, on which the moulding plate 16 is fixed. The two supports 15 act as guides for the ejecting piston 17 and the pattern-making piston 18 which is taken through the latter. These two pistons which can be raised and lowered form together with their end surface the bottom of the moulding space of the moulding plate 16. The ejecting piston 17 is connected in a pivotal manner by pins Z, Z' on either side with a cranked lever, into slots in which levers the pins Z, Z' extend. These cranked levers bear with their lever arms provided with rollers against the eccentrics 20, so that through the rotary motion of the latter the ejecting piston 17 can either descend or is raised. The raising and lowering of the pattern-producing piston 18 is effected in the same manner, which piston is also pivotally connected on either side to a cranked lever 21. The cranked arms of these levers, which are provided with rollers, rest against the eccentrics 22, through the rotary motion of which the pattern-making piston 18 is either raised or can descend. The lowering of the pistons is effected by compression or tension springs 26, 27. For turning the eccentrics 20 a handle 23 and for turning the eccentrics 22 a handle 24 is provided. The position in each case and the rotary motion of the eccentrics 20 and 22 can be limited or fixed by stops not shown in the drawing. Both the cranked levers 19, 21 and the two eccentric shafts are journalled in the supports 15. The ejecting piston 17 engages under the pattern-making piston 18 in such a manner that the latter is carried along positively, when the ejecting piston 17 is raised. Owing to this arrangement, all that is required for instance for ejecting the patterned filling is to turn the eccentric 20. According to the constructional example shown the two pistons 17, 18 are also so constructed that, when in the bottom position, they rest on one another and on the base plate 14. For the same purpose adjustable stops, for instance adjustable screws with counter-nuts, may be provided on the base plate 14, by means of which the lowest position of the piston and the depth of the filling spaces can be set in an adjustable manner.

Figure 3:
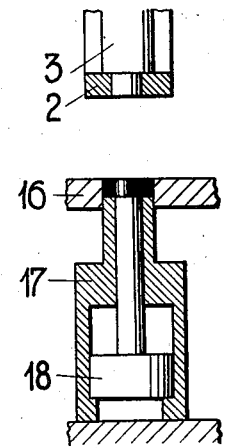
Figure 5:
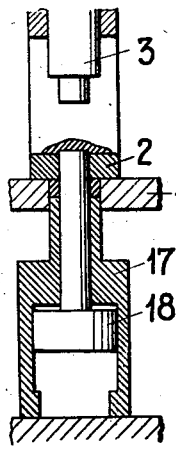
Figure 6:
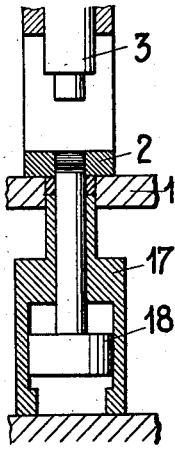
Figure 7:
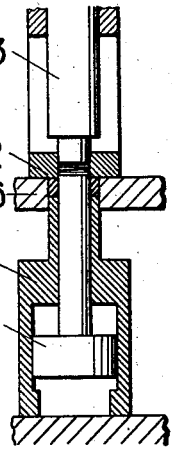
Figure 8:
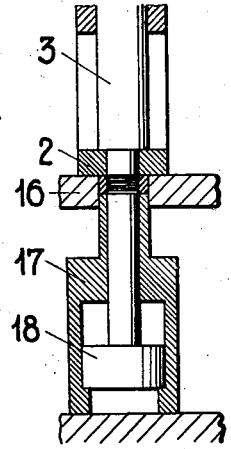
Figure 9:
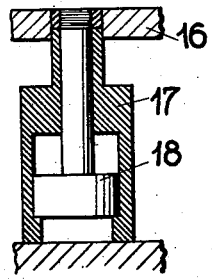

The production of a pressed article with a permeating ring pattern can be carried out as shown diagrammatically in Figs. 3 to 12 with the aid of the described arrangement in the following manner:

First of all the moulding space of the moulding plate 16 is filled, as shown in Fig. 3 with black powder. Thereupon the lower part B of the mould is brought with this filling exactly under the matrix 2 of the upper part A of the mould. The exact position may also be limited or fixed by a stop or indicated by a mark. The matrix 2 is then lowered on to the moulding plate 16 so as to close the mould, shown in Fig. 4, by turning the crank arrangement 7. Thereupon, as shown in Fig. 5, the pattern-making piston 18 is raised and by this means that part of the black filling, which is to be replaced by another colour, is ejected through the matrix 2. The raising of the pattern-making piston 18 is effected, as already explained, by turning the eccentric 22. The ejected black powder is then removed and the pattern-making piston 18 lowered, as shown in Fig. 6, to such an extent that it nearly reaches the filling already introduced into the mould space. Into the space of the matrix 2, thus freed, a powder of a different colour is introduced, which is indicated in the drawings by horizontal hatching. On to this filling, as shown in Fig. 7, the plunger 3 is lowered, through the pressure of which the filling is at first slightly compressed, for which reason a suitably thicker layer of this filling must be introduced. The pattern-making piston 18 is thereupon lowered and to the same extent as this piston is lowered the plunger 3 will follow, owing to the spring or weight pressure acting on it, this filling of other coloured material into the black powder, until the bottom position is reached, as shown in Fig. 8. In this position the plunger 3 will rest on the matrix and can therefore no longer act on the filling. After this operation the matrix 2 is raised and the plunger 3 is returned into the initial position, as shown in Fig. 9, by turning the crank shafts 7 and 10, and the actual pattern-making operation is complete.

Figure 10:
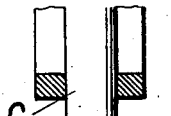

The lower part B of the mould with the patterned filling can then be brought under a press and the press plunger C of the same, as shown in Fig. 10, and the filling can either be immediately finish-pressed or be cold-pressed only to such an extent that it will not break up when ejected from the moulding plate 16. It will be of advantage to arrange this pressing arrangement on the same slide rail 1 next to the upper part A of the mould, for then it will only be necessary to slide the lower part B of the mould with the patterned filling along on the slide rail 1, until it comes under the pressing arrangement.

Figure 11:
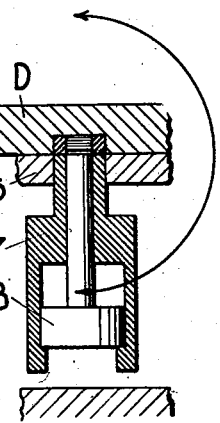

The procedure may however also be such that over the moulding plate 16 a special press plate D is placed, as shown in Fig. 11, into the pressing space of which the patterned filling can be pushed by raising the two pistons 17, 18. Thereupon the press plate D along with the lower part B of the mould is turned over as indicated by the arrow, the lower part of the mould is lifted off and the patterned article is finish-pressed in the press plate D.

Figure 12:
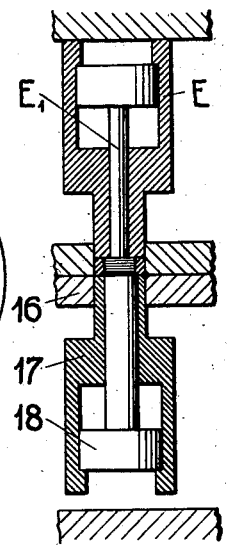

The procedure is similar when making complicated patterns requiring several profiled pattern-making pistons. In these cases there is placed in an inverted position on the moulding plate 16 a complete lower mould part E, in which is guided the differently patterned pattern-making piston E¹, as shown in Fig. 12. Thereupon the patterned filling of the lower part B of the mould is pushed into the moulding space of the superposed lower part E of the mould, the two lower parts of the mould are together turned over and the filling thus transferred into the mould part E can be provided in the manner already described with a second permeating pattern of different design. In the case of complicated patterns the same process need only be repeated as often as is required by the particular patterns.

The upper parts of the moulds, the press plungers, matrices and the like can also be arranged in a circle and the lower parts of the mould be brought to them along the arc of a circle, as already described. Finally, the motion of the eccentrics and crank shafts, which perform the raising and lowering of the pistons, matrices and plungers, may also be effected automatically by power drive, by means of transmission members known per se, for instance toothed wheels, cam discs or the like.

What I claim is:

1. A method of producing, in a mould, pressed articles having a pattern extending completely through them from materials in powder form consisting in filling the mould with moulding material, forcing a plunger profiled with the pattern right through the mold upwardly from below, so as to remove a part of the material from said mould to form a space in the material of selected contour, filling said space with moulding material of a different color and subjecting the materials thus moulded to a finish-pressing process.

2. An apparatus of the character described comprising a member having a moulding space therein adapted to be initially filled with moulding material, a profiled piston movable through said space for displacing a part of the moulding material and forming a space in the latter, a matrix movable against said member and having an opening of the same profile as said piston for receiving additional material, and a piston movable independently of the matrix for inserting the additional material in the space formed in the first mentioned material after the withdrawal of the first mentioned piston therefrom.

3. An apparatus of the character described comprising a member having a moulding space therein adapted to be initially filled with moulding material, a profiled piston movable through said space for displacing a part of the moulding material and forming a space in the latter, a matrix movable against said member and having an opening of the same profile as said piston for receiving additional material, and a piston movable independently of the matrix for inserting the additional material in the space formed in the first mentioned material after the withdrawal of the first mentioned piston therefrom, and means for ejecting the material from said moulding space after the withdrawal of the matrix from said member.

4. An apparatus as claimed in claim 2 characterized by the provision of a piston arranged adjacent the profiled piston and cooperating therewith at times to form the bottom of said moulding space.

5. An apparatus as claimed in claim 2, characterized by the provision of means supporting said member for movement laterally with respect to said matrix.

6. An apparatus as claimed in claim 2, characterized by the provision of means for guiding the movement of said matrix, and means supporting said member for movement angularly with respect to the direction of movement of said matrix.

7. An apparatus as claimed in claim 2, characterized in that the second mentioned piston is movably guided by said matrix.

8. An apparatus as claimed in claim 2, characterized by the provision of swinging levers coacting with said matrix and pistons for imparting movement thereto.

9. An apparatus as claimed in claim 2, characterized by the provision of a member cooperating with the profiled piston at times to form the bottom of the moulding space, the profiled piston being movable independently of the last mentioned member in the operation of displacing a part of the moulding material, and means connecting the last mentioned member with said profiled piston for imparting movement to the latter when the last mentioned member is actuated.

HEINRICH SKOLAUDE.